United States Patent
Lerisson et al.

(10) Patent No.: US 8,244,395 B2
(45) Date of Patent: *Aug. 14, 2012

(54) METHOD FOR MANAGING AN ACTIVE SAFETY FOR AN AUTOMATICALLY OPERATING MACHINE

(75) Inventors: Jean-Pierre Lerisson, Pessac (FR); Alain Sanchez, Pessac (FR)

(73) Assignee: LECTRA, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,467

(22) Filed: Jun. 3, 2011

(65) Prior Publication Data
US 2011/0231005 A1 Sep. 22, 2011

Related U.S. Application Data

(63) Continuation of application No. 12/096,294, filed as application No. PCT/FR2006/051286 on Dec. 6, 2006, now Pat. No. 8,078,308.

(30) Foreign Application Priority Data
Dec. 7, 2005 (FR) ..................................... 05 53759

(51) Int. Cl.
*G06F 19/00* (2011.01)
(52) U.S. Cl. ......... 700/177; 340/541; 340/679; 700/253
(58) Field of Classification Search .................. 700/177, 700/178; 348/152; 340/679, 680, 686.6; 318/568.2, 568.12; 83/58–68, 72, 75, 76.1, 83/360
See application file for complete search history.

(56) References Cited

U.S. PATENT DOCUMENTS

| | | | |
|---|---|---|---|
| 4,104,976 A | 8/1978 | Landau et al. | |
| RE31,247 E | 5/1983 | Johnstone | |
| 5,198,800 A | 3/1993 | Tozawa et al. | |
| 5,614,115 A | 3/1997 | Horton et al. | |
| 5,939,986 A | 8/1999 | Schiffbauer et al. | |
| 6,778,092 B2 | 8/2004 | Braune | |
| 6,784,800 B2 | 8/2004 | Orzechowski | |
| 6,945,738 B2 | 9/2005 | O'Quinn et al. | |
| 6,956,348 B2 | 10/2005 | Landry et al. | |

(Continued)

FOREIGN PATENT DOCUMENTS
DE 10324628 A1 12/2004
(Continued)

*Primary Examiner* — Dave Robertson
(74) *Attorney, Agent, or Firm* — Smith Gambrell & Russell LLP

(57) ABSTRACT

This invention relates to a method for managing active safety for an automatically operating machine comprising a work surface and a work tool displaced according to a pre-established work program. The method consists of dividing (100) the work surface into several zones and, during the work program cycle and in response to detection (200) of an operator's intrusion into a first zone when the tool is active in a second zone, also consists of carrying out at least one of the following actions: keeping (210) the tool's programmed displacement at the normal speed if the tool's displacement is programmed in a zone not adjacent to the first one, keeping (220) the tool's programmed displacement at reduced speed if the tool's displacement is programmed in a zone adjacent to the first one and modifying (230) the work program if the tool's displacement is programmed in the first zone so that the tool's work can be continued in a zone other than the first one.

12 Claims, 2 Drawing Sheets

U.S. PATENT DOCUMENTS

| | | |
|---|---|---|
| 6,963,278 B2 | 11/2005 | Frame |
| 7,055,417 B1 | 6/2006 | Gass |
| 7,084,779 B2 | 8/2006 | Uneyama |
| 7,373,863 B2 | 5/2008 | O'Banion et al. |
| 7,391,178 B2 | 6/2008 | Tanaka et al. |
| 7,395,123 B2 * | 7/2008 | Papenbreer et al. ............ 700/21 |
| 7,412,861 B2 | 8/2008 | Lohmann |
| 7,623,031 B2 | 11/2009 | Haberer et al. |
| 7,768,549 B2 * | 8/2010 | Cofer ............................ 348/152 |
| 7,783,386 B2 * | 8/2010 | Merte et al. ................... 700/255 |
| 2002/0186299 A1 * | 12/2002 | Cofer ............................ 348/152 |
| 2005/0207619 A1 | 9/2005 | Lohmann |
| 2008/0021597 A1 * | 1/2008 | Merte et al. ................... 700/255 |
| 2009/0271026 A1 | 10/2009 | Lerisson et al. |

FOREIGN PATENT DOCUMENTS

| | | |
|---|---|---|
| FR | 0553759 | 12/2005 |
| WO | WO 2006 024431 | 3/2006 |
| WO | WO 2007 066040 | 6/2007 |

* cited by examiner

METHOD FOR MANAGING AN ACTIVE SAFETY FOR AN AUTOMATICALLY OPERATING MACHINE

This application is a continuation of U.S. patent application, Ser. No. 12/096,294, filed Oct. 24, 2008 (now U.S. Pat. No. 8,078,308), (which is a national stage application of international application PCT/FR2006/051286, filed on Dec. 6, 2006), which claims the priority of French patent application No. 0553759, filed on Dec. 7, 2005, which priority is again hereby claimed. The disclosure of each of the above applications is hereby incorporated herein by reference.

BACKGROUND OF THE INVENTION

This invention relates to a method for managing active safety for an automatically operating machine.

The invention's field of application is particularly that of automatic cutting, tracing or engraving machines with which a work tool, such as a cutting, writing or engraving tool, is displaced on a work surface according to a pre-established program for cutting, tracing or engraving material placed on the work surface.

This is the case, in particular with the numerically controlled cutting machines used for cutting textiles, felt, leather or other soft materials in sheets in the clothing industry, furniture industry, etc. In these machines, cutting is carried out by means of a vibrating blade, a wheel, laser beam or jet of water under pressure held by a cutting head which is displaced with respect to the material on the work surface going in two different directions and according to a pre-established cutting program. The material can be arranged in superimposed sheets forming a mattress so that several simultaneous cuts can be made.

This type of cutting machine can also comprise an air suction system, producing a partial vacuum in a sealed chamber which is situated under the work surface. By covering the material to be cut with a film of airtight material, the material to be cut is held against the work surface under the combined effect of atmospheric pressure applied to the material and the partial vacuum maintained in the sealed chamber.

The presence and intervention of operators are necessary during the cutting program cycle, in particular during the cutting preparation operations (such as placing the material to be cut, covering the material with the airtight film and checking the work done by the cutting tool) and during the post-work operations (such as off-loading the pieces cut out). This causes a safety problem in the work zone and around the cutting machine.

A known solution to this problem consists of equipping the cutting machine with sensors for detecting the presence of, for example, an operator's arm or hand which is in the work zone. Reference is to be made to, for example, document EP 1 240 456 B1 which describes a cutting machine provided with sensors for optically detecting the presence of an obstacle in the path of the cutting tool during its displacement.

In the event that an abnormal situation emerges (the presence of an obstacle in the path of the cutting tool, for example), the safety devices such as the one described in document EP 1 240 456 B1 operate the cutting off of the cutting machine's electrical supply, thus stopping the machine working, in order to protect the operator.

Although satisfactory for the operator's safety, interruption of the cutting machine causes a certain number of problems. In particular, stoppage of the machine is carried out to the detriment of its productivity. In fact, interruption of the cutting program involves the loss of information on the position of the cutting tool at the time when the machine was stopped. When operation of the machine is re-established, this loss then causes problems with finding out the exact location of resumption of the cutting program, which impairs the machine's productivity. In addition, certain simple manual operations (such as getting rid of a crease in a piece of textile or adding a piece of airtight film to re-establish the seal on a piece of textile) cannot be performed by the operator during one of the machine's working cycles without triggering the machine's stoppage. Therefore, these operations need to be performed during scheduled interruptions of the machine, which are carried out to the detriment of its productivity.

OBJECT AND SUMMARY OF THE INVENTION

The principal aim of this invention is therefore to mitigate these drawbacks by proposing a method for managing active safety for an automatically operating machine with which the losses of productivity arising from detection of an abnormal situation can be limited, yet without reducing the protection provided for the operator.

This aim is achieved due to a method for managing active safety for an automatically operating machine comprising a work surface and a work tool displaced on the work surface according to a pre-established work program for working on material placed on the work surface, characterized in that it consists of dividing the work surface into several zones and, during the work program cycle and in response to the detection of an intrusion by an operator into a first zone while the tool is active in a second zone, other than the first one, also consists of carrying out at least one of the following actions:
  keeping the programmed displacement of the tool at the normal speed if the tool displacement is programmed in a zone not adjacent to the first one,
  keeping the programmed displacement of the tool at a reduced speed if the tool displacement is programmed in a zone adjacent to the first one and
  modifying the work program if the tool displacement is programmed in the first zone when the intrusion by the operator continues to be detected there, so that the tool's work can be continued in a zone other than the first one.

In response to detection of an intrusion by an operator in a zone of the work surface and depending on the programmed displacement of the work tool with respect to this zone, the method according to the invention directs a particular action with which a risk situation for the operator can be avoided, yet without involving a complete stoppage of the machine. A result of this is a limitation of the losses of the machine's productivity, while the operator's protection is guaranteed.

According to an advantageous feature of the invention, in the case of a modification of the work program, the displacement of the tool in a zone other than the first one is carried out at normal speed when the tool displacement is programmed in a zone not adjacent to the first one and at reduced speed when the tool displacement is programmed in a zone adjacent to the first one.

According to another advantageous feature of the invention, during the work program cycle and in response to the detection of an intrusion by an operator into a first zone while the tool is active in a second zone, other than the first one, the following action can also be carried out.

If the tool displacement is programmed to remain in the second zone: keeping the tool's programmed work at the normal speed and indicating to the operator that he can work in a zone other than the second one.

The aim of this feature is to indicate to the operator that he can work without danger in a zone of the work surface. So, certain manual operations such as getting rid of a crease, adding a fragment of airtight film or picking up pieces cut earlier can be carried out by the operator during one of the machine's working cycles, without interrupting said machine.

Also an object of the invention is an automatically operating machine comprising a work surface divided into several zones, a work tool displaced on the work surface according to a pre-established work program for working on material placed on the work surface and means of detecting an operator's intrusion into one of the work surface zones, characterized in that it also comprises means—during the work program cycle and in response to detection of an operator's intrusion into a first zone when the tool is active in a second zone, other than the first one—for carrying out at least one of the following actions:
- keeping the programmed displacement of the tool at the normal speed if the tool displacement is programmed in a zone not adjacent to the first one,
- keeping the programmed displacement of the tool at a reduced speed if the tool displacement is programmed in a zone adjacent to the first one and
- modifying the work program if the tool displacement is programmed in the first zone when the intrusion by the operator continues to be detected there, so that the tool's work can be continued in a zone other than the first one.

BRIEF DESCRIPTION OF THE DRAWINGS

Other features and advantages of this invention will emerge from the description given below, with reference to the attached drawings which illustrate an embodiment thereof, devoid of any limiting nature. Of the illustrations.

DETAILED DESCRIPTION OF AN EMBODIMENT

In the following description, a method is considered for managing active safety for a numerically controlled cutting machine used for cutting textiles, felt, leather or other soft materials in sheets in the clothing industry, furniture industry, etc.

More generally, the invention is applicable to machines for working on a material by means of a tool displaced on a work surface according to a pre-established work program. This is the case with, for example, cutting, tracing or engraving machines.

Figure 1:
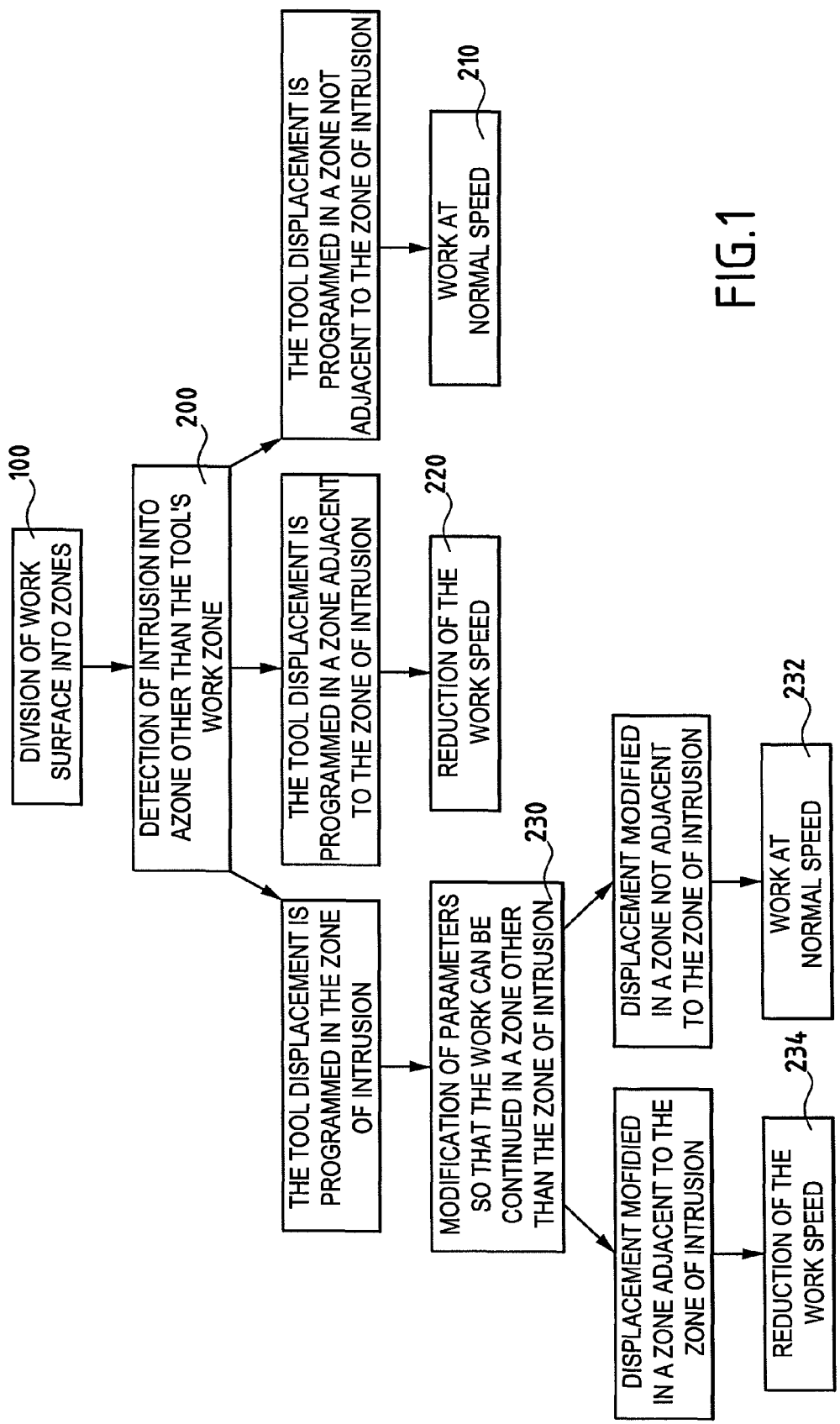
FIG. 1 is a diagram showing various different stages of implementing a method for managing active safety according to the invention and FIG. 2 is a schematic view of a cutting machine for the implementation of a method for managing active safety according to the invention.

Reference will be made first to FIG. 1, which shows the stages of a particular embodiment of a method for managing active safety according to the invention.

According to a first step (100) of the method, the work surface is divided into several geometric zones. This division can be carried out either with respect to the cutting table (the zones corresponding to geometric surfaces of the table) or with respect to the pieces to be cut out which are on the cutting table (the division zones therefore include a whole number of pieces to be cut out).

According to a second step (200) of the method, during the cutting program cycle and in response to detection of an operator's intrusion into a first zone when the cutting tool is active in a second zone, other than the first one, at least one of the following actions is performed:
- if the tool displacement is programmed in a zone not adjacent to the first zone, the cutting tool's programmed displacement is kept at the normal speed (210),
- if the tool displacement is programmed in a zone adjacent to the first zone, the cutting tool's programmed displacement is kept but at reduced speed (220) and
- if the cutting tool displacement is programmed in the first zone when the operator's intrusion continues to be detected there, the work program is modified so that the tool's work can be continued in a zone other than the first one (230).

Zone adjacent to the first zone is to be understood as a zone in the division of the table having a side in common with the first zone.

Advantageously, in the case of modification of the work program (230), the cutting tool displacement in a zone other than the first one is carried out at normal speed when the tool displacement is programmed in a zone not adjacent to the first one (232) and at reduced speed when the tool displacement is programmed in a zone adjacent to the first one (234).

Advantageously again, during the cutting program cycle and in response to detection of an operator's intrusion into a first zone when the tool is active in a second zone, other than the first one, the following action can also be carried out:
- if the tool displacement is programmed to remain in the second zone, the cutting tool's programmed work is kept at the normal speed and indication is given to the operator that he can work in a zone other than the second one.

Example of Application of the Method for Managing Active Safety

This example relates to managing active safety for a numerically controlled soft materials cutting machine.

Figure 2:
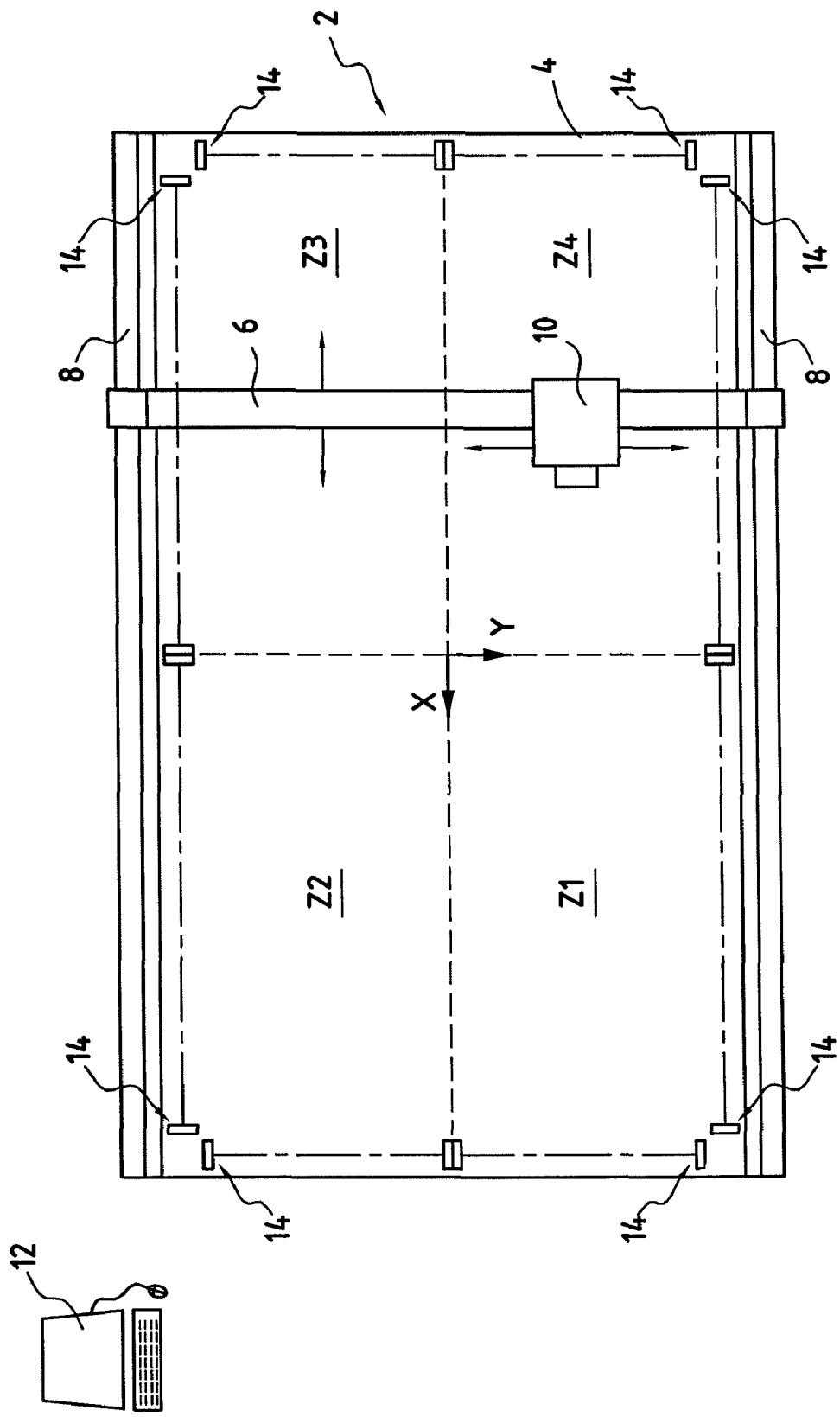

FIG. 2 schematically and partially shows such a cutting machine.

In a manner known per se, this machine comprises an actual table 2, of which the top face 4 forms the work surface. Above the table, a gantry support 6 is suitable for being displaced along guides 8 arranged in the direction of the table's longitudinal axis X.

The gantry support 6 carries a cutting head 10 which is capable of moving along the gantry support in the direction Y, substantially perpendicular to the direction X. Thus, the cutting head 10 can reach any point of the work surface 4.

The cutting head 10 is equipped with a cutting blade (not shown) for cutting out the outlines desired in a soft material, for example textiles, placed on the table.

The machine can also comprise means for creating a partial vacuum on the surface of the table to ensure that the material to be cut is held on the work surface.

With a computer 12 for numerical control of the cutting head, the operations of starting cutting and displacing the gantry support 6 and the cutting head 10 when pieces are made from the soft material can be programmed and controlled.

In accordance with the first step of the method for managing active safety, the work surface is divided up into several geometric zones.

In the example of application in FIG. 2, the work surface 4 is thus divided into four rectangular zones, Z1 to Z4, of substantially equal dimensions. Of course, the number and shape of the work surface division zones could be different.

The second stage of the method provides for the detection, during the cutting program cycle, of an operator's intrusion into one of the work surface zones Z1 to Z4.

As the cutting machine of this type is accessible on both sides, as well as at the front and rear of the table, intrusion detection can be carried out by means of presence sensors, for example, connected to the machine's numerical control computer.

Thus, in the example of application in FIG. 2, eight optical sensors 14 are provided, formed by pairs of transmitters and receivers which are arranged around the table 2 so as to define the work surface division zones Z1 to Z4. When one of the optical beams is cut by an obstacle (the operator's arm or hand, for example), a signal is transmitted to the numerical control computer 12.

Alternatively, detection of intrusion into one of the work surface zones could be carried out by means of different sensors, such as electronic or ultrasonic sensors for example or, alternatively again, by means of cameras connected to the numerical control computer.

When an operator's intrusion is thus detected in one of the work surface division zones, the information is transmitted to the numerical control computer 12 for analysis. In response, the computer can program various different actions according to the location of the cutting tool, its programmed displacement and the zone of intrusion. Some examples are detailed below.

Situation 1

An operator's intrusion is detected in zone Z2 by the optical sensors 14 arranged around the table. The cutting head 10 is situated in zone Z4 and the cutting tool displacement is programmed in this very zone Z4.

Given that the zone of intrusion Z2 and the cutting tool programmed displacement zone Z4 are non-adjacent zones (they have no side in common), the cutting head control computer 12 therefore keeps the tool's programmed displacement in zone Z4 at the normal speed.

Situation 2

An operator's intrusion is detected in zone Z2 by the optical sensors 14. The cutting head 10 is situated in zone Z4 and the cutting tool displacement is programmed in zone Z3.

As cutting tool programmed displacement zone Z3 is adjacent to the zone of intrusion Z2 (these zones have a side in common), the cutting head control computer 12 therefore keeps the tool's programmed displacement in zone Z3 but at a speed which is reduced as long as the operator's intrusion continues to be detected in zone Z2.

Situation 3

An operator's intrusion is detected in zone Z1 by the optical sensors 14. The cutting head 10 is situated in zone Z4 and the cutting tool's displacement is programmed in the zone of intrusion Z1.

The cutting head control computer 12 therefore modifies the cutting head's displacement so that the tool's work can be continued in a zone other than zone Z1, i.e. either in zone Z2 or in zone Z3.

If the modification of the program of displacement of the cutting head involves displacement of the latter into zone Z2 which is adjacent to the zone of intrusion Z1, this displacement will be carried out at a speed which will be reduced as long as the intrusion continues to be detected. Conversely, if this modification results in displacement of the cutting head into zone Z3, not adjacent to the zone of intrusion Z1, the displacement will take place at the normal speed.

Situation 4

An operator's intrusion is detected in zone Z1 by the optical sensors 14. The cutting head 10 is situated in zone Z4 and the cutting tool's displacement is programmed to remain in this very zone Z4 (no change of zone is programmed).

The cutting head control computer 12 therefore keeps the tool's programmed work in zone Z4 at the normal speed. In addition, it can indicate to the operator that he can work in a zone other than the work zone Z4 (i.e. either in zone Z2 or in zone Z3). This work can consist, for example, of picking up the pieces which have previously been cut out in these zones Z2 and Z3. Throughout this work, the computer 12 continues to "watch for" any intrusions by the operator.

Of course, irrespective of the situation described above, the control computer can also emit a visual or audible alarm to warn the operator of a potential danger.

In addition, in the case of an extreme situation not described above, when an operator's intrusion is detected in the same zone as the cutting tool work zone, the computer will direct the stoppage of the cutting machine in order to protect the operator.

The invention claimed is:

1. A method for managing active operator safety for an automatically operating machine comprising a work surface and a single work tool operating on the work surface according to a pre-established work program for working on a material placed on the work surface, wherein the method comprises:

dividing the work surface into a plurality of contiguous zones, the plurality of contiguous zones comprising a first zone and at least one other zone being adjacent to the first zone;

providing a pre-established work program for operating the work tool in a production mode in at least one other zone of the divided work surface at a normal speed of displacement of the work tool;

in response to detection of an operator's intrusion into the first zone; and selectively modifying the work program displacement of the work tool while continuing to operate the work tool in a production mode according to the pre-established work program at a reduced speed of displacement of the work tool in the at least one other zone or at a normal or reduced speed of displacement in another one of the plurality of zones, the modifying of the work program displacement zone and speed of displacement of the work tool based on the adjacency of the first zone to the at least one other zone or another zone of the plurality of zones of operating by the pre-established work program.

2. The method of claim 1, wherein the method further comprises:

operating the work tool in a production mode at the normal speed of displacement:
a. if the work tool is operating in a second zone that is not adjacent to the first zone, and
b. if the work program is programmed to displace the work tool only in the second zone.

3. The method of claim 1, wherein the method further comprises:

operating the work tool in a production mode at a reduced speed of displacement:
a. if the work tool is operating in a second zone that is not adjacent to the first zone, and
b. if the work program is programmed to displace the work tool into a third zone, and
c. the third zone is adjacent to the first zone.

4. The method of claim 1, wherein the method further comprises:

modifying the work program to displace the work tool into a third zone other than the first zone:
a. if the work tool is operating in a second zone that is adjacent to the first zone, and b. if the work program is programmed to displace the work tool into the first zone, and operating the work tool in a production mode at a reduced speed of displacement if the third zone is adjacent to the first zone.

5. The method of claim 1, wherein the method further comprises:

modifying the work program to displace the work tool into a third zone other than the first zone:

a. if the work tool is operating in a second zone that is adjacent to the first zone, and b. if the work program is programmed to displace the work tool into the first zone, and operating the work tool in a production mode at a normal speed of displacement if the third zone is not adjacent to the first zone.

6. The method of claim 1, wherein the method further comprises:

operating the work tool in a production mode at a normal speed of displacement:

a. if the work tool is operating in a second zone that is adjacent to the first zone, and b. if the work program is programmed to displace the work tool into the second zone, and communicating a warning to the operator that the work tool is operating in the second zone that is an adjacent zone.

7. An automatically operating machine comprising a work surface and a single work tool operating on the work surface according to a pre-established work program for working on material placed on the work surface, wherein the operating of the work tool by the pre-established work program comprises:

dividing the work surface into a plurality of contiguous zones, the plurality of contiguous zones comprising a first zone and at least one other zone being adjacent to the first zone;

providing a pre-established work program for operating the work tool in a production mode in the at least one other zone of the divided work surface at a normal speed of displacement of the work tool;

in response to detection of an operator's intrusion into the first zone; and selectively modifying the work program displacement of the work tool while continuing to operate the work tool in a production mode according to the pre-established work program at a reduced speed of displacement of the work tool in the at least one other zone or at a normal or reduced speed of displacement in another of the plurality of zones, the modifying of the work program displacement zone and speed of displacement of the work tool based on the adjacency of the first zone to the at least one other zone or another zone of the plurality of zones of operating by the pre-established work program.

8. The automatically operating machine of claim 7, wherein the operating of the work tool by the pre-established work program further comprises:

operating the work tool in a production mode at the normal speed of displacement:

a. if the work tool is operating in a second zone that is not adjacent to the first zone, and b. if the work program is programmed to displace the work tool only in the second zone.

9. The automatically operating machine of claim 7, wherein the operating of the work tool by the pre-established work program further comprises:

operating the work tool in a production mode at a reduced speed of displacement:

a. if the work tool is operating in a second zone that is not adjacent to the first zone, and b. if the work program is programmed to displace the work tool into a third zone, and c. the third zone is adjacent to the first zone.

10. The automatically operating machine of claim 7, wherein the operating of the work tool by the pre-established work program further comprises:

modifying the work program to displace the work tool into a third zone other than the first zone:

a. if the work tool is operating in a second zone that is adjacent to the first zone, and b. if the work program is programmed to displace the work tool into the first zone, and operating the work tool in a production mode at a reduced speed of displacement if the third zone is adjacent to the first zone.

11. The automatically operating machine of claim 7, wherein the operating of the work tool by the pre-established work program further comprises:

modifying the work program to displace the work tool into a third zone other than the first zone:

a. if the work tool is operating in a second zone that is adjacent to the first zone, and b. if the work program is programmed to displace the work tool into the first zone, and operating the work tool in a production mode at a normal speed of displacement if the third zone is not adjacent to the first zone.

12. The automatically operating machine of claim 7, wherein the operating of the work tool by the pre-established work program further comprises:

operating the work tool in a production mode at a normal speed of displacement:

a. if the work tool is operating in a second zone that is adjacent to the first zone, and b. if the work program is programmed to displace the work tool into the second zone, and communicating a warning to the operator that the work tool is operating in the second zone that is an adjacent zone.

* * * * *